United States Patent
Klausing et al.

(10) Patent No.: US 7,023,375 B2
(45) Date of Patent: Apr. 4, 2006

(54) RADAR SYSTEM FOR OBSTACLE WARNING AND IMAGING OF THE SURFACE OF THE EARTH

(75) Inventors: Helmut Klausing, Wessling-Hochstadt (DE); Horst Kaltschmidt, Neubiberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 65 days.

(21) Appl. No.: 10/475,596

(22) PCT Filed: Apr. 24, 2002

(86) PCT No.: PCT/DE02/01496

§ 371 (c)(1),
(2), (4) Date: Oct. 23, 2003

(87) PCT Pub. No.: WO02/088771

PCT Pub. Date: Nov. 7, 2002

(65) Prior Publication Data

US 2004/0201513 A1   Oct. 14, 2004

(30) Foreign Application Priority Data

Apr. 26, 2001   (DE) ................ 101 20 536

(51) Int. Cl.
  *G01S 13/90* (2006.01)
(52) U.S. Cl. .............. 342/25 A; 342/25 R; 342/29; 342/179; 342/180
(58) Field of Classification Search .......... 342/25 R, 342/26 B, 29, 36, 52–54, 59, 63, 65, 90, 342/179, 180, 25 A
See application file for complete search history.

(56) References Cited

U.S. PATENT DOCUMENTS

| | | | | |
|---|---|---|---|---|
| 6,054,947 A | * | 4/2000 | Kosowsky | 342/191 |
| 6,166,677 A | * | 12/2000 | Kikuchi et al. | 342/25 R |
| 6,384,766 B1 | * | 5/2002 | Ulander | 342/25 R |
| 6,577,264 B1 | * | 6/2003 | Wolframm | 342/25 R |
| 6,795,590 B1 | * | 9/2004 | Chen | 382/294 |
| 2005/0007272 A1 | * | 1/2005 | Smith et al. | 342/189 |

FOREIGN PATENT DOCUMENTS

| | | |
|---|---|---|
| DE | 39 220 86 | 10/1990 |
| DE | 40 07 612 | 5/1991 |
| DE | 43 23 511 | 1/1995 |
| DE | 43 28 573 | 3/1995 |
| DE | 197 31 262 | 2/1999 |
| DE | 100 15 164 | 10/2001 |
| EP | 0445794 | 9/1991 |
| GB | 2317086 | 2/1998 |

OTHER PUBLICATIONS

Klausing e al.; "Feasibility of a Synthetic Aperture Radar with Rotating Antennas (ROSAR)", IEEE international radar conference, May 7-10, 1990, pp.: 51-56.*

* cited by examiner

Primary Examiner—Thomas H. Tarcza
Assistant Examiner—Isam Alsomiri
(74) Attorney, Agent, or Firm—Collard & Roe, P.C.

(57) ABSTRACT

A radar system for active obstacle warning and imaging of the surface of the earth, working in the pulse frequency or FH-CW range, which can be used in on-line operation in real time, includes a plurality of antenna elements for sending and receiving radar signals, which are arranged on the fuselage of an aircraft, and which may be turned on and scanned sequentially, whereby a synthetic aperture can be generated by means of periodic sending and receiving of the antenna elements. Antenna elements are arranged along the curved surface of the aircraft contour, whereby a SAR processor is present, which analyzes the data obtained from the antenna elements and displays them as processed radar images on board the aircraft, in a virtual cockpit.

9 Claims, 3 Drawing Sheets

RADAR SYSTEM FOR OBSTACLE WARNING AND IMAGING OF THE SURFACE OF THE EARTH

CROSS REFERENCE TO RELATED APPLICATIONS

Applicants claim priority under 35 U.S.C. §119 of GERMAN Application No. 10120536.8 filed Apr. 26, 2001. Applicants also claim priority under 35 U.S.C. §365 of PCT/DE02/01496 filed on Apr. 24, 2002. The international application under PCT article 21(2) was not published in English.

BACKGROUND OF THE INVENTION

1. Field of the Invention

The invention relates to a radar system for obstacle warning and imaging the surface of the earth.

2. The Prior Art

A radar system for obstacle warning and imaging the surface of the earth is known from DE 40 07 612 C1. There, a forward-view radar is described, which is attached to the fuselage of an aircraft, and images the sector region lying ahead of the aircraft in two dimensions. In this connection, the forward-view radar described comprises an antenna consisting of several antenna elements arranged next to one another, for sending and receiving. By means of turning on and scanning the antenna elements, in a time sequence, one after the other, a synthetic aperture is generated, as it is known from the SAR principle. In this connection, the analysis of the radar signals takes place in such a manner that each antenna element is analyzed individually, whereby digital processing is carried out for each angle range, by means of correlation of a special, predetermined referenced function. A disadvantage in this connection is the poor angle resolution. Other analysis methods are known from Fan, Z. F. et al., in "High Resolution Imaging of Objects at Ka Band," IEEE Trans. on Aerospace and Electronic Systems, 1995, Vol. 31, Issue 4, p. 1348–1352, and Li, H.-J. et al., in "Nonuniformly Spaced Array Imaging," IEEE Trans. on Antennas and Propagation, 1993, Vol. 41, Issue 3, page 278–286.

The radar system known from DE 40 07 612 C1 proves to be disadvantageous in that it can only image the forward-lying sector region. Regions adjacent to the side must be imaged by means of additionally installed antenna systems. This means a significant installation effort and expenditure. In addition, complicated analysis methods are required in order to be able to image the various sector regions.

SUMMARY OF THE INVENTION

It is therefore the underlying object of the invention to indicate a single radar system with which not only a forward view but also a side view is possible.

This object is accomplished using the radar system according to the invention. Advantageous embodiments of the invention are also described.

According to the invention, the antenna elements are arranged along the curved surface of the aircraft contour, whereby an SAR processor is present, which analyzes the data obtained by the antenna elements and displays them as processed radar images on board the aircraft, in a virtual cockpit.

The antenna elements can now be advantageously turned on in accordance with the sector region to be imaged. The data obtained from the antenna elements, in each instance, can be advantageously analyzed according to the linear SAR method or according to the ROSAR method.

In the proposed radar system, the synthetic aperture known from the conventional SAR method is not generated in that the aircraft moves relative to the target object, for example, but rather the individual antenna elements, arranged adjacent to one another, are electronically turned on and scanned, in a time sequence, one after the other. In the analysis according to the ROSAR method, as well, the rotating antenna movement is simulated by means of turning on and scanning adjacent antenna elements, with a time offset.

In an advantageous embodiment of the invention, the antenna elements are arranged spatially in order to generate a three-dimensional radar system. In this connection, the antenna elements are brought together as two-dimensional antenna arrays, which are adapted to the curved contour of the aircraft and affixed on the aircraft.

An advantage of this spatial arrangement of the two-dimensional antenna array on the contour of the aircraft is that the scanning plane of the antenna elements is uncoupled from the flight plane of the aircraft. This means that the scanning plane can be kept constant, independent of the flight plane. In the case of severe air turbulence or when the aircraft is flying and turning, in particular, it can happen that the object to be imaged disappears from the viewing range of the radar. This is prevented by the two-dimensional antenna array advantageously arranged along the contour of the aircraft.

The radar system according to the invention can advantageously be used also on fighter and/or reconnaissance drones or ships. In this connection, it can be used as an all-weather viewing system, in each instance, and allows aircraft, for example, to land and take off safely even on airports that are not specifically equipped, in any weather.

BRIEF DESCRIPTION OF THE DRAWINGS

The invention as well as other advantageous embodiments will be explained in greater detail in the following, using drawings. These show.

DETAILED DESCRIPTION OF PREFERRED EMBODIMENTS

Figure 1:
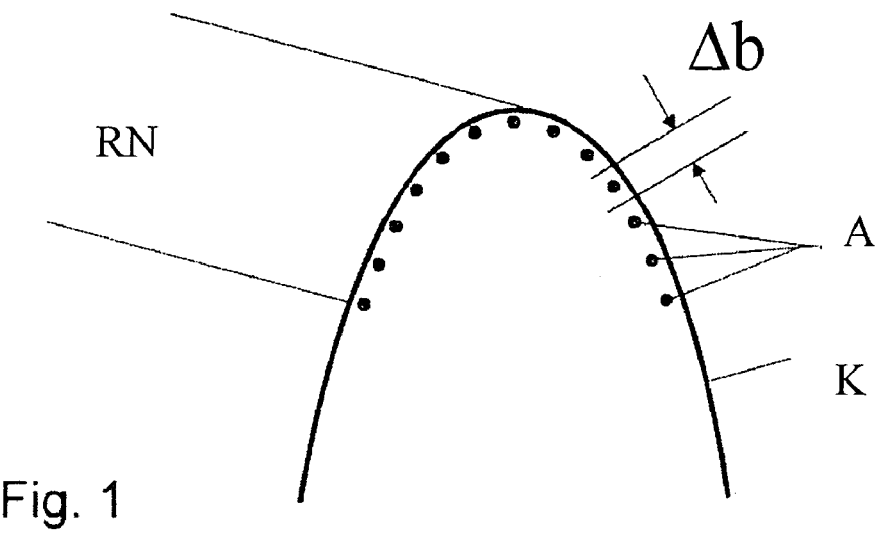
FIG. 1 an exemplary embodiment for the installation of the antenna elements into the region of a radar nose of an aircraft, in a schematic representation.

FIG. 1 shows a schematic representation of a first exemplary embodiment of the arrangement of the antenna elements along the contour of the aircraft. Sending and receiving antenna elements A are mounted on a curve that corresponds to the contour K of the aircraft, for example, at a distance Δb, in the region of the radar nose RN. In this connection, Δb is λ/2, whereby λ is the wavelength of the sending signal.

Figure 4:
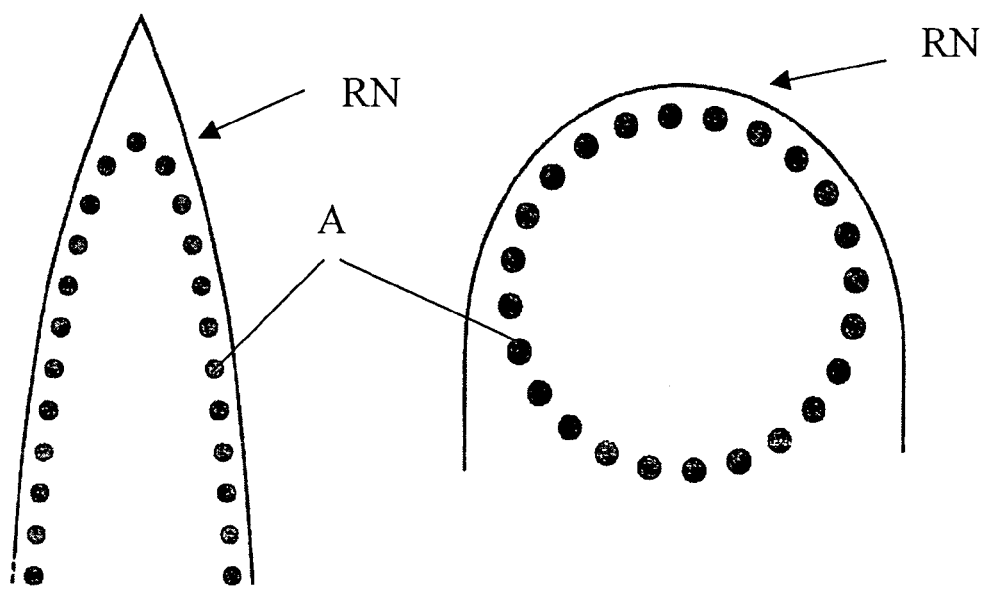
FIG. 4 exemplary embodiments of the arrangement of antenna elements in radar noses of various shapes.

FIG. 4 shows two other exemplary arrangements of the antenna elements, whereby the view of an aircraft from below is shown as an example, in each instance. Of course this arrangement can also be transferred to the top view or side view of the aircraft. In the arrangement on the left, the antenna elements A are arranged along the contour of the aircraft, towards the tip of the radar nose RN of the aircraft. In this connection, the arrangement of the antenna elements A along the contour of the aircraft can occur as any desired curve.

The representation on the right in FIG. 4 shows another exemplary arrangement possibility of the antenna elements A along the contour of the aircraft. For reasons of the representation, the arrangement of the antenna elements A appears as a circle in this connection, although in reality, the antenna elements A are arranged along a curve that is adapted to the contour of the aircraft.

Figure 2:
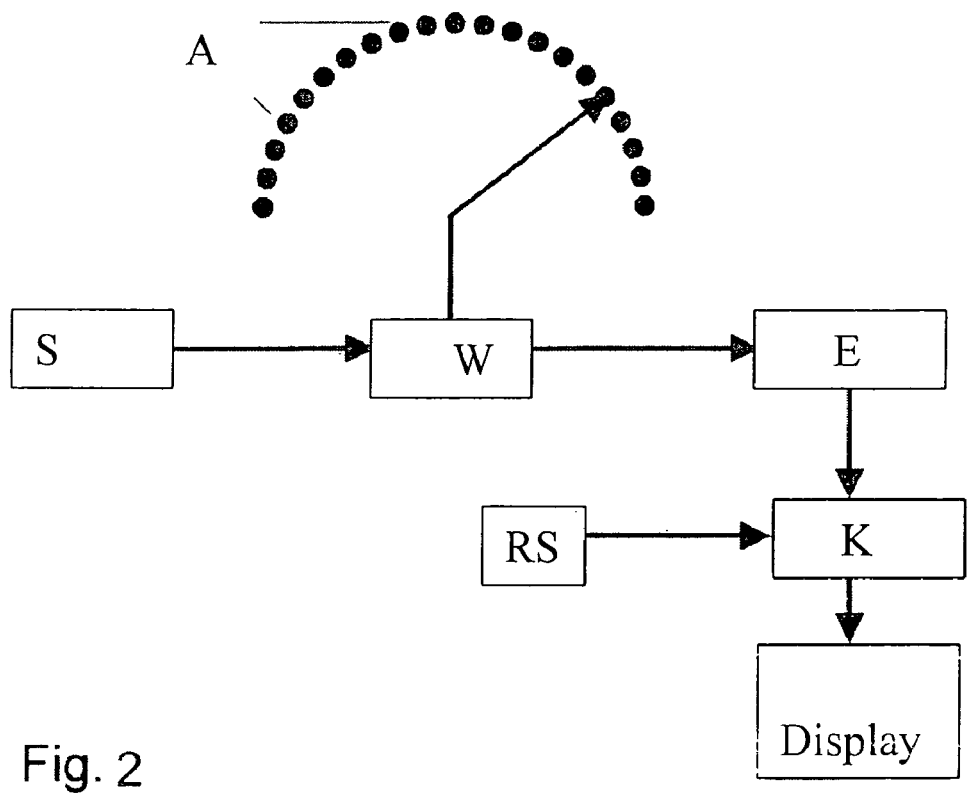
FIG. 2 an exemplary embodiment of an electrical block schematic according to FIG. 1.

FIG. 2 shows a block schematic of the electrical wiring of an exemplary embodiment according to FIG. 1. During a time Δt, the sending and receiving antennas A are switched to a phase-stable HF transmitter S, in each instance, and afterwards, during the time Δt, to a receiver E. The continuous, rotatory movement of the antennas that occurs in connection with the ROSAR principle, for example, is carried out electronically here, by switching the HF transmitter S on from one antenna element A to the next. In this connection, a reflex point on the runway that is to be imaged (not shown) or a point (not shown) in its vicinity is given a sending signal that is changed in phase over time. In the receiving phase, the receiver E also receives a signal that is changed in phase. A positive Doppler shift that changes over time occurs, as long as the antenna scanning moves towards the reflex point.

As soon as the antenna scanning moves away from the reflex point, a negative Doppler shift that changes over time is generated. The overlay of the Doppler history, i.e. the phase history over the original sending signal at a constant frequency is calculated for every lateral position of a reflex point, such as, for example, in the ROSAR standard method for helicopters, but with inclusion of the flight velocity.

As in the standard method, the reflection of a reflection point that is an image point of the scene to be imaged is determined using a cross-correlation, performed in a correlator K, of the received signal mixture with the reference signal of this reflection point, which is derived from the reference signal memory RS. Here again, in the present case the individual reference signals, with the exception of special cases, differ for a distance ring only by the angle position, so that a separate reference signal does not have to be stored in memory and correlated for every reflection point.

In contrast to the ROSAR radar system, in which the helicopter is assumed to be at rest, the problem of a rapid change in distance due to the high flight velocity occurs with the radar system proposed here, and this results in image distortion. Aside from the possibility of modeling the entire movement sequence and thereby being able to include it in all the calculations, particularly in the image distortion correction, the electrical scanning offers an extreme shortening of the entire scanning cycle, so that the effect of the change in distance results in an image distortion that is small enough to be ignored. In this way, calculation-intensive image distortion correction is not necessary.

Figure 3:
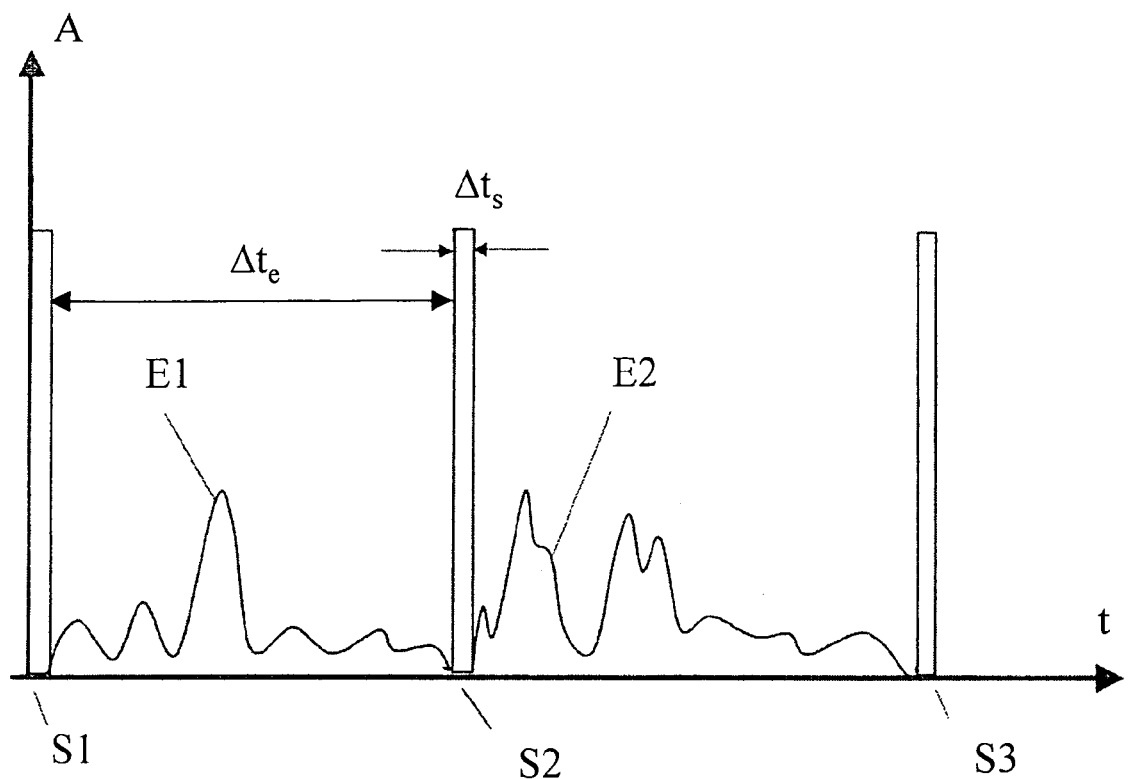
FIG. 3 a diagram with reference to the sequence of sending and receiving signals according to the exemplary embodiment according to FIG. 1.

FIG. 3 shows an exemplary embodiment for the progression of sending and receiving signals with their "sending" and "receiving" intervals. The progression of adjacent antenna elements being turned on, which repeats over time, is shown on the abscissa. The first antenna element sends the short transmission pulse S1 during the time $\Delta t_s$. During the subsequent time span $\Delta t_e$, the first antenna element receives the sending signal E1. The amplitude of the sending and receiving signal is shown on the ordinate, without any units.

Furthermore, it is proposed that pilot visual equipment is present, in which the radar data that are obtained can be displayed. For example, a virtual cockpit can be present, in which a three-dimensional computer image of the surroundings is imaged, for example.

By means of displaying a current image of obstacles in the virtual cockpit, a significant increase in the efficiency of computer-oriented flight control can be achieved. The virtual cockpit requires current location data from GPS. Because of the required position accuracy, the more suitable "differential GPS" is proposed for this purpose. If there is any need to efficiently transmit position or obstacle data, either an HF/VHF data link or mobile communications via GSM or satellite network are proposed. The use of mobile communications allows two-way communications, i.e. full duplex operation and group communication. The advantage of HF/VHF communication lies in the independence from available infrastructures. Autarchic communication possibilities are particularly required for military deployments in partly unknown territory.

Figure 5:
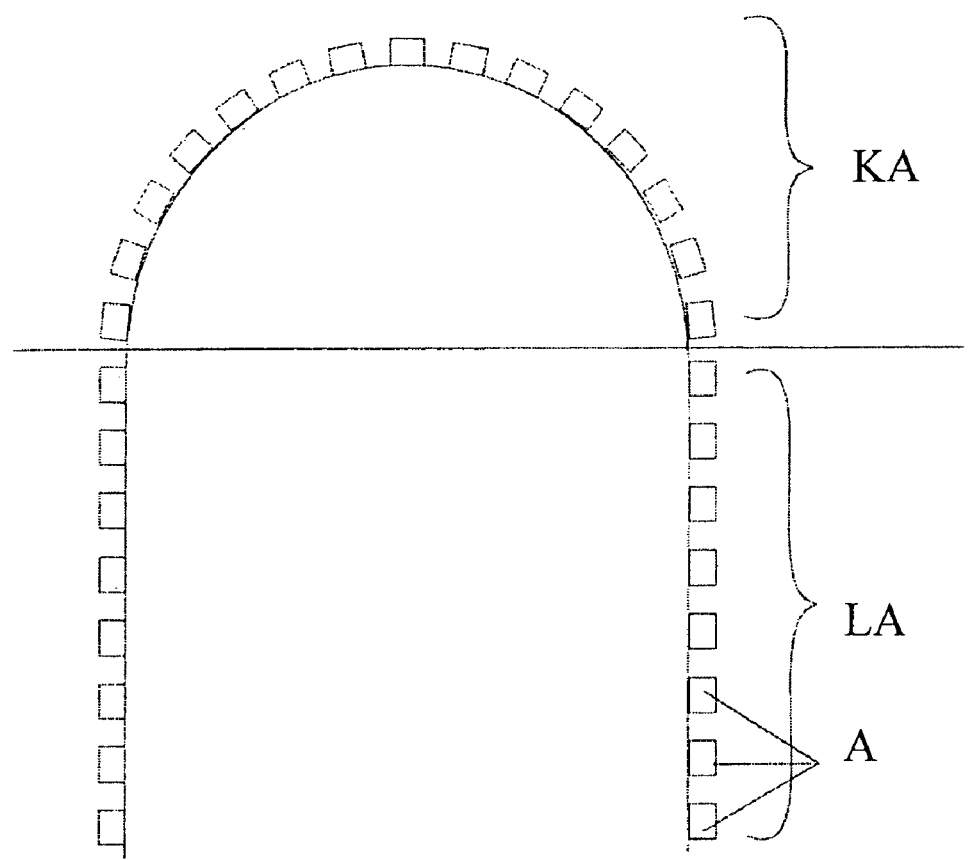
FIG. 5 a schematic diagram with reference to an exemplary embodiment for an antenna arrangement according to the ROSAR principle and the linear SAR principle.

FIG. 5 shows another exemplary embodiment of the radar system according to the invention. In this connection, a cross-section through the fuselage of an aircraft is shown. It is advantageous if the radar data of the antenna elements of the segment KA of the antenna array on the fuselage, which is shown as a circle, as an example, are analyzed according to the ROSAR method. It is advantageous if the segment LA of the antenna array, which follows this segment KA, is analyzed according to the linear SAR method.

By means of this advantageous combination of the two analysis methods, the radar system according to the invention makes an all-around view possible, without a "squint mode" being required, for example, which would be connected with losses in resolution, i.e. an increased signal processing effort because of the slanted antenna sight angle.

Figure 6:
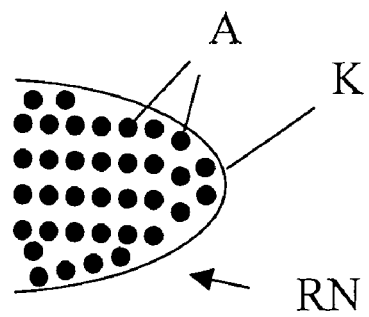
FIG. 6 an exemplary embodiment of a surface arrangement of the antenna elements in the region of a radar nose of an aircraft, in a schematic representation.

FIG. 6 shows another exemplary embodiment of the radar system according to the invention. In this connection, a schematic representation of the radar nose RN of an aircraft is shown in a side view. The antenna elements A are arranged on the surface, in accordance with the contour K of the aircraft. In this connection, the antenna elements A are brought together in antenna arrays, which are not shown in the drawing, for the sake of a better overview.

In this connection, the arrangement of antenna elements A shown is merely exemplary. Of course a different arrangement of the antenna elements A is also possible.

The invention claimed is:

1. Radar system for active obstacle warning and imaging of the surface of the earth, working in the pulse frequency or FM-CW range, which can be used in on-line operation in real time, comprising
a plurality of antenna elements for sending and receiving radar signals, which are arranged on the fuselage of an aircraft, and which may be turned on and scanned sequentially,
whereby a synthetic aperture can be generated by means of periodic sending and receiving of the antenna elements, wherein the antenna elements are arranged along the curved surface of the aircraft contour, whereby a SAR processor is present, which analyzes the data obtained from the antenna elements and displays them as processed radar images on board the aircraft, in a virtual cockpit; and wherein the synthetic aperture that is generated from a first predetermined segment of the antenna elements is processed according to the linear ROSAR method; and wherein the synthetic aperture that is generated from a second predetermined segment of the antenna elements is processed according to the linear SAR method.

2. Radar system according to claim 1,
wherein the time for a scanning cycle is selected in such a manner that despite the airplane movement, no distortion of the image of the outdoor scene to be imaged occurs, which is also referred to as smudging of image points.

3. Radar system according to claim 1,
wherein the calculation of reference signals for important image points of the outdoor scene takes place according to the known ROSAR method, but with additional consideration of the flight velocity.

4. Radar system according to claim 1,
wherein in order to form a three-dimensional radar system, the antenna elements, brought together in antenna arrays, are positioned appropriately in terms of space.

5. Radar system according to claim 1,
wherein the data obtained can be displayed as a three-dimensional computer image in the virtual cockpit.

6. Radar system according to claim 1,
wherein in order to increase the efficiency of computer-oriented flight control, the current obstacles can be displayed in the virtual cockpit.

7. Radar system according to claim 1,
wherein the current position data can be input into the virtual cockpit by means of GPS or differential GPS.

8. Radar system according to claim 1,
wherein an HF/VHF data link is present, with which an efficient transmission of the position and obstacle data by means of mobile communications via GSM or satellite network is possible.

9. Radar system according to claim 1, for use in battle and/or reconnaissance drones.

* * * * *